UNITED STATES PATENT OFFICE.

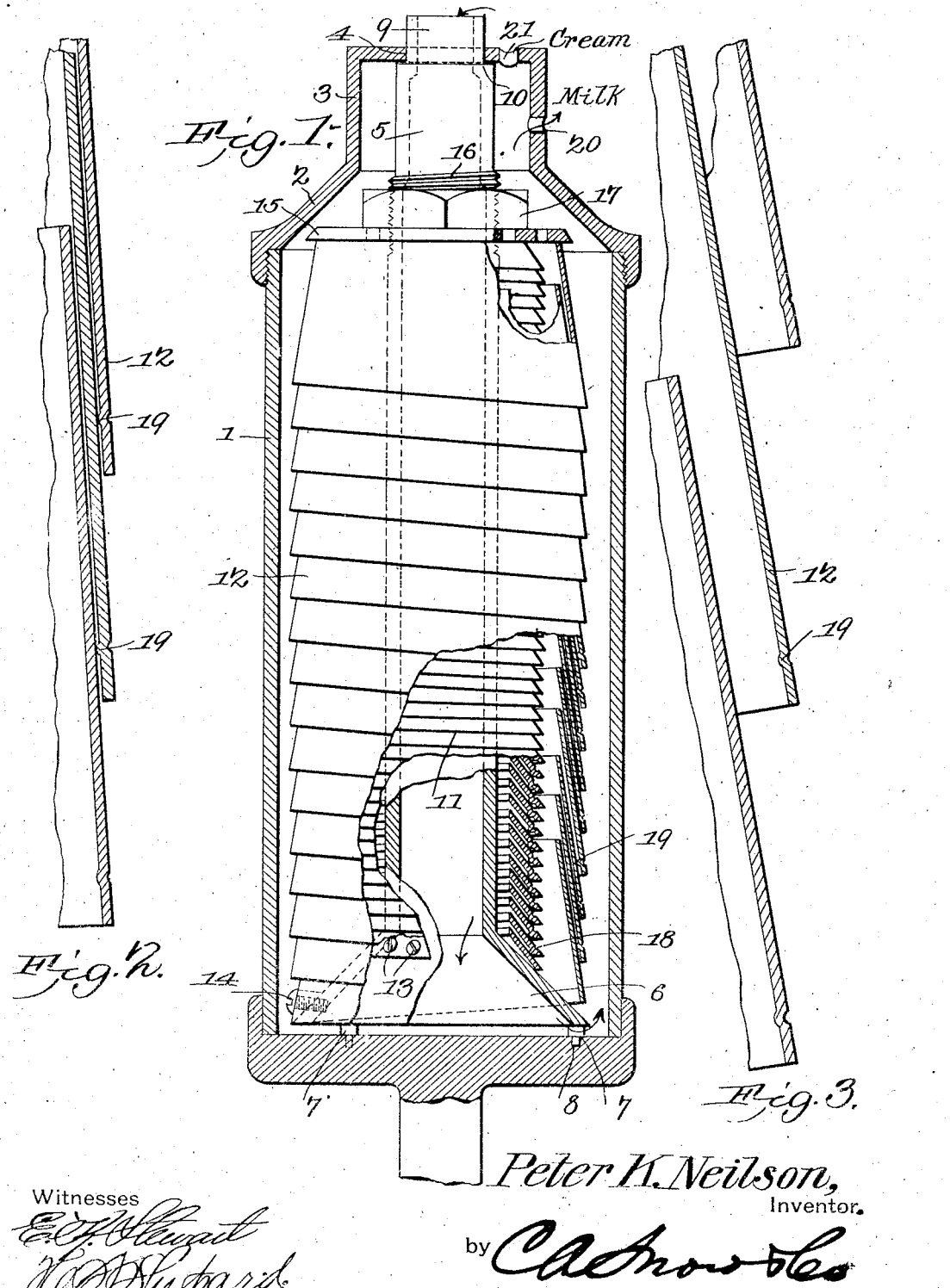

PETER K. NIELSEN, OF MINNEAPOLIS, MINNESOTA.

CENTRIFUGAL SEPARATOR.

No. 834,018.

Specification of Letters Patent.

Patented Oct. 23, 1906.

Application filed October 14, 1905. Serial No. 282,803.

*To all whom it may concern:*

Be it known that I, PETER K. NIELSEN, a citizen of the United States, residing at Minneapolis, in the county of Hennepin and State of Minnesota, have invented a new and useful Centrifugal Separator, of which the following is a specification.

This invention relates to centrifugal separators, and is particularly designed for the separation of cream from whole-milk. In machines of this character it is customary to employ a series of superimposed rings or partitions, usually frustums of cones, arranged concentrically within the liquid-space of the rotating bowl and around a central feed-tube and crossing the radial lines of the bowl. When a series of separating devices of this character are connected to form a single composite element, it is difficult to cleanse the same, and when the separating devices are unconnected it requires considerable time and attention to remove and replace the same.

Having appreciated these difficulties, it is the prime object of the present invention to provide an improved separating element which may be conveniently fitted in place and removed as a whole, and when removed access can be conveniently had to all parts thereof for the effective cleansing of the device, thereby to maintain the apparatus in a sanitary condition.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a view of a centrifugal separator embodying the features of the present invention, the bowl being in section and other portions broken away to illustrate the assemblage of the parts of the device. Fig. 2 is an enlarged fragmentary sectional view of one of the separating devices in its operative condition. Fig. 3 is a similar view of the separating device removed from the bowl.

Like characters of reference designate corresponding parts in all of the figures of the drawings.

The present device includes any ordinary or preferred form of bowl 1, which is adapted to be rotated rapidly upon its longitudinal axis. The top of the bowl is closed by means of a removable cap 2, which preferably tapers upwardly and terminates in a cylindrical crown portion 3, having a central circular opening 4. Within the bowl there is a feed-tube 5, which is provided at its lower end with a flared or substantially conical flange or base 6, having a series of feet 7, each of which is received within a seat or socket 8 in the bottom of the bowl, so as to prevent looseness of the tube and to space the lower end thereof slightly above the bottom of the bowl. The upper end of the tube is provided with a reduced terminal 9, fitting in the opening 4 in the top of the cap 2 and producing an annular shoulder 10, bearing against the under side of the cap 2, so as to hold the feed-tube snugly within the bowl. The parts thus described are common and well-known, and therefore may be varied considerably without affecting the spirit of the present invention.

In carrying out the present improvements there are provided independent concentric helical separating members 11 and 12, which are spaced from the feed-tube and from one another. The width of the whirls of the inner helix is less than that of the outer helix, and the inner whirls are set at an angle of about forty-five degrees to the vertical, while the whirls of the outer helix are set at a more acute angle to the vertical. It will here be noted that each helical spring member is practically composed of a series of superimposed hollow elements, which have substantially the shapes of frustums. The lower end of the inner helix is secured to the bottom portion of the feed-tube by one or more fastenings 13, and the outer helix is secured to the feed-tube, as at 14, at a point below the attachment of the inner helix. Upon the tops of the two helixes there is a perforate plate 15, and the feed-tube 5 is threaded adjacent its upper end, as at 16, for the reception of a nut 17, which is employed to force the plate or washer 15 against the helixes, and thereby compress the same, so as to bring their whirls mutually into close relation, but out of contact. Each whirl of the inner helix is provided upon its inner or under face and adjacent its lower edge with a series of bosses or projections, one of which is shown at 18 in Fig. 1 of the drawings, said projections being designed for engagement with the top of the next below whirl, so as to maintain the whirls spaced in order that the material under treatment may pass between the whirls. The whirls of the outer helix are provided with similar internal projections 19. By preference these projections are formed by punching or stamping the material of the whirls.

Aside from the helical shape of the separating members it will be noted that each member is made up of a plurality of superimposed annular tapered elements, the elements of the outer member being wider than those of the inner member and also set at more acute angles to the vertical than those of the inner member.

In practice, the parts being assembled as in Fig. 1, the bowl is rotated upon its longitudinal axis, and whole-milk is fed into the open top of the feed-tube 5, from which it escapes between the bottom of the bowl and the bottom edge of the base-flange 6, after which it rises in the annular space between the feed-tube 5 and the bowl, where it is subjected to the separating action of the two helixes. By reason of the difference in the specific gravity of the cream and the other milk constituents the cream gathers around the feed-tube, while the milk collects in the annular space between the bowl and the outer helix. As whole-milk is continued to be fed into the top of the feed-tube 5 the separated milk and cream rise in separate annular columns in the bowl until the milk escapes through an opening 20, formed in the bowl adjacent the top thereof, while the cream rises through the perforate plate 15 and escapes through an opening 21, formed in the cylindrical upper portion of the cap 2.

To cleanse the device, the cap 2 is taken off and the nut 17 removed, after which the fastenings 13 and 14 are removed, which permits expansion of the two helixes, so as to give access between the whirls thereof, as indicated in Fig. 3, whereby all parts of the separating elements are conveniently accessible to be cleansed, which permits of the device being maintained in a sanitary condition. Moreover, as the whirls of each helix are connected, each separating member may be removed and replaced as a whole, thereby materially facilitating the assembling of the apparatus. When the parts are in place, they are rigidly maintained in their operative positions in a very simple and effective manner, while the several parts may be conveniently removed for cleansing the same and replacing them when damaged.

It will here be explained that the nut 17 is independent of the cover 2, whereby the space between the whirls of the helix may be adjusted by manipulating the nut 17 before the feed-tube and the helix are introduced into the bowl. By this manner of adjustment the helix is in full view, whereby the annular space between the whirls of the helix may be accurately gaged. When the helix is in the bowl, the spaces between the whirls may be increased by loosening the nut 17 without removing the feed-tube. As the nut 17 is independent of the cover, the removal of the cover does not affect the tension upon the helix.

Having thus described the invention, what is claimed is—

1. A centrifugal separator comprising a bowl, a cover therefor, a feed-tube, an elastic helical separating element embracing the tube, and means carried by the tube and located within the bowl independent of the cover for adjusting the pitch of the helix.

2. A centrifugal separator comprising a bowl, a cover therefor, a feed-tube having an externally-threaded part within the upper portion of the bowl, an elastic helical separating element embracing the tube, means for fastening one end of the element to the tube, and a nut on the threaded portion of the tube for frictionally holding the opposite end of the element and maintaining the latter axially compressed.

3. A centrifugal separator comprising a bowl, a feed-tube rising above the top of the bowl, a removable cover carried by the bowl and engaging the feed-tube to hold the same in the latter, concentric helical separating elements embracing the tube, means for fastening corresponding ends of the elements to the tube, and an adjustable means carried by the tube which is independent of the cover and bears against the opposite ends of the elements to simultaneously adjust the same and hold them under tension.

4. A centrifugal separator comprising a bowl, a removable cover therefor, concentric separating elements arranged in the bowl and each composed of a single strip of metal wound in the form of a helix, the strip of the inner element being of smaller cross-section than that of the other element and having its convolutions disposed at a less acute angle to the vertical than the convolutions of the outer element, a feed-tube extending through the cover and arranged within the inner elements, and an adjustable device on the feed-tube independent of the cover for frictionally engaging the elements to hold the latter fixed with respect to the tube and under compression.

5. A centrifugal separator having a pair of concentric helical separating members, the whirls of one helix being set at a different angle than those of the other helix.

6. A centrifugal separator having a pair of concentric helical separating members, the whirls of the outer member being set at a more acute angle to the vertical than those of the inner member.

7. A centrifugal separator having a pair of concentric helical separating members, the whirls of one member being wider than those of the other member.

8. A centrifugal separator having a pair of concentric helical separating members, the whirls of the outer member being wider than those of the inner member.

9. A centrifugal separator, having a pair of concentric helical separating members, the whirls of the outer member being wider and also set at a more acute angle to the vertical than those of the inner member.

In testimony that I claim the foregoing as my own I have hereto affixed my signature in the presence of two witnesses.

PETER K. NIELSEN.

Witnesses:
  FLORENCE PEARSON,
  P. P. SWENSEN.